3,254,101
5,10-METHYLENE-19-NOR-ANDROSTANES
Lawrence H. Knox, Mexico City, Mexico, assignor to Syntex Corporation, Panama, Panama, a corporation of Panama
No Drawing. Filed Feb. 20, 1964, Ser. No. 346,096
18 Claims. (Cl. 260—397.5)

The present invention relates to certain novel cyclopenotanophenanthrene derivatives and to the method for the production thereof.

More particularly, it relates to certain novel 5,10-methylene-19-nor-androstan derivatives, substituted at C-3 or at C-1 and C-3 by lower alkyl, alkenyl or alkinyl radicals, and to the method for the preparation of these compounds.

The novel compounds of the present invention are represented by the following formulas:

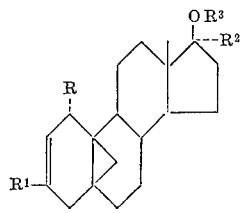
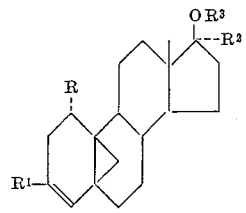
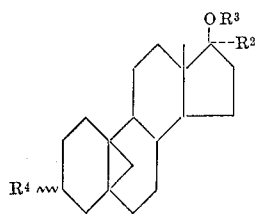
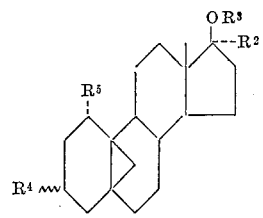

In the above formulas R and $R^1$ represent a lower alkyl, alkenyl or alkinyl group such as methyl, ethyl, propyl, vinyl, propenyl, ethinyl, propinyl, etc.; $R^2$ represents hydrogen or a lower alkyl, alkenyl or alkinyl group, $R^3$ represent hydrogen or an acyl group of less than 12 carbon atoms and $R^4$ and $R^5$ represent a lower alkyl radical.

The acyl groups above referred to are derived from hydrocarbon carboxylic acids containing less than 12 carbon atoms which may be saturated or unsaturated, of straight, branched, cyclic or cyclicaliphatic chain, or aromatic, and may be substitued by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

These compounds are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, and suppress the output of the pituitary gland. The compounds having a lower alkenyl or alkinyl group at C-17α also have progestational activity and are useful in the treatment of menstrual disorders and in fertility control.

The method for producing the compounds of the present invention is illustrated by the following sequence of reactions:

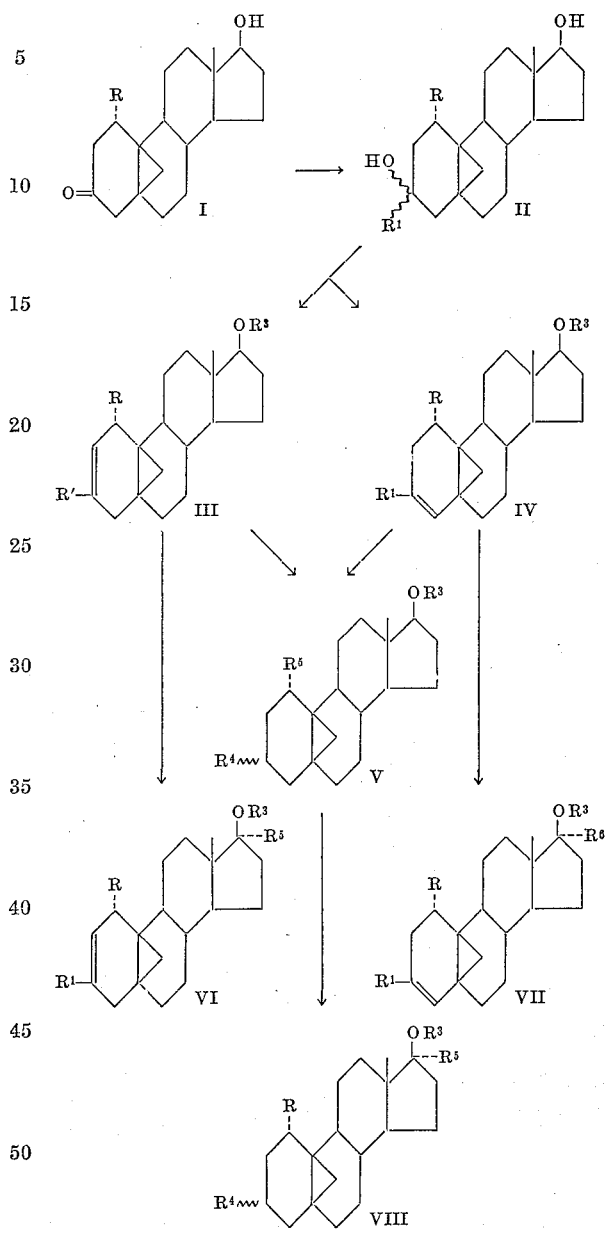

In the above formulas, R, $R^1$, $R^3$, $R^4$ and $R^5$ have the same meaning as heretofore set forth and $R^6$ represents a lower alkyl, alkenyl or alkinyl group.

In the practicing the process illustrated above, a 1α-alkyl, alkenyl or alkinyl-5,10-methylene-19-nor-androstan-17β-ol-3-one compound (I) (obtained by reaction of 19-hydroxy-$\Delta^4$-androstene-3,17-dione with 2-chloro - 1,1,2-trifluorotriethylamine, reduction of the 5,10- methylene-19-nor-$\Delta^1$-androstene-3,17-dione thus obtained with lithium aluminum hydride, to produce 5,10- methylene-19-nor-$\Delta^1$-androstene-3β,17β-diol, reoxidation of the hydroxyl group at C-3 with manganese dioxide to produce 5,10-methylene-19-nor - $\Delta^1$-androsten - 17β-ol-3-one and final treatment of the latter compound with an alkyl, alkenyl or alkinyl magnesium halide as described in our copending patent applications Serial No. 286,931 filed June 11, 1963 now U. S. Pat. No. 3,184,484 and Serial No. 346,074 filed of even date herewith) is reacted with an aliphatic hydrocarbon magnesium halide such as methyl magnesium bromide, ethyl magnesium bromide, vinyl magnesium bromide, ethinyl magnesium bromide, propargyl magnesium bromide, etc. in an inert organic solvent such as ether, benzene, tetrahydrofuran and the like, at a temperature comprised between room temperature and reflux, for a period of time between 1 to 6 hours to produce the corresponding 3-alkyl, alkenyl, or alkinyl-3-hydroxy-1-substituted-5,10-methylene - 19 - nor-androstan-17β-ol-compounds (II), which are then dehydrated to produce a mixture of 1,3-disubstituted-5,10-methylene-19-nor-Δ²-androsten-17β-ol and 1,3 - disubstituted-5,10-methylene - 19 - nor - Δ³ - androsten-17β-ol (III and IV, R³=H), which are separated by chromatography on Florisil or neutral alumina.

These compounds can be conventionally esterified by treatment with acid anhydrides or chlorides of less than 12 carbon atoms in pyridine solution, thus affording the corresponding esters (III and IV, R³=acyl).

Catalytic hydrogenation of III and IV in the presence of a heavy metal catalyst, preferably in the presence of a palladium catalyst and in an alcoholic solvent, produce the saturated compounds (V), by absorption of 1 molar equivalent of hydrogen when R and R¹ are lower alkyl groups, or from 2 to 5 molar equivalents when R and/or R¹ are alkenyl or alkinyl radicals. There are thus obtained mixtures of 1α,3α-dialkyl-5,10-methylene-19-nor-androstan-17β-ols and 1α,3β-dialkyl-5,10-methylene-19-nor-androstan-17β-ols, the latter predominating, which can be purified by fractional crystallization or chromatography. This hydrogenation is preferably conducted at room temperature and atmospheric pressure, however, these conditions are not critical.

In order to obtain the 17-alkyl, alkenyl and alkinyl substituted derivatives of the abovementioned compounds III, IV and V (R³=H) are converted into the respective 17-keto derivatives, by oxidation with chromic acid, and these compounds are treated again with a Grignard reagent of the type hereinbefore indicated, or with an alkyl lithium or the sodium or potassium salt of an alkine, to produce the respective 1,3,17-trihydrocarbon substituted compounds (VI, VII and VIII; R³=H), which can be converted into the corresponding esters by conventional treatment with acid anhydrides of less than 12 carbon atoms in benzene solution and in the presence of p-toluenesulfonic acid.

The 3-alkyl, alkenyl or alkinyl substituted-5,10-seco-5,19-cyclo-Δ¹⁽¹⁰⁾,²,⁴-androstatrien-17β-ol compounds or the corresponding 17α-alkyl, alkenyl or alkinyl substituted derivatives thereof, described below (IX) and obtained as described in the aforementioned patent applications are hydrogenated in the presence of a heavy metal catalyst, using preferably a palladium-charcoal catalyst, in alcohol solution, and there are obtained, by absorption of from 2 to 6 molar equivalents of hydrogen, depending on the substituents at C-3 and/or C-17α, the 3β-alkyl- and 3β,17α-dialkyl-5,10-methylene-19-nor-androstan-17β-ol compounds in mixture with the 3α-isomers (X):

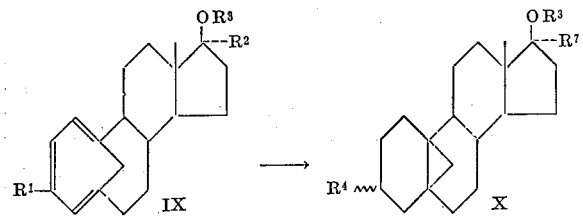

In the above formulas R¹, R², R³ and R⁴ have the same meaning as previously described and R⁷ represents hydrogen or a lower alkyl group.

By oxidation of the 3α and 3β-alkyl-5,10-methylene-19-nor-androstan-17β-ol compounds (X; R³ and R⁷=H) there are obtained the corresponding 17-keto derivatives, which upon reaction with an alkenyl or alkinyl magnesium halide or the sodium or potassium salt of a lower alkyne give rise to the corresponding 17α-alkenyl or alkinyl-17β-hydroxy derivatives, which can be converted into the corresponding esters by the above described method.

The 17α-alkenyl compounds may also be obtained by partial hydrogenation of the 17α-alkinyl derivatives.

The following examples serve to illustrate but are not intended to limit the scope of the present invention:

Example I

A solution of 2.5 g. of 1α-methyl 5,10-methylene-19-nor-androstan-17β-ol-3-one in 95 cc. of ether was added dropwise, over a 15 minute period, to 25 cc. of 4 N-methyl-magnesium bromide solution in ether, under stirring, and the reaction mixture was stirred at room temperature under anhydrous conditions for 4 hours further. After this time it was treated carefully with saturated sodium sulfate solution and solid sodium sulfate, the inorganic material was filtered off and washed well with ether, and the filtrate evaporated to dryness. The residue was crystallized from acetone-hexane, thus affording 1α,3-dimethyl-5,10-methylene-19-nor-androstane-3,17β-diol.

Example II

A solution of 1 g. of the foregoing compound in 7 cc. of dry pyridine was cooled to —10° C., treated with 0.4 cc. of thionyl chloride and the mixture allowed to stand for 4 minutes at this temperature. Ice-water was added and the product extracted with methylene chloride. The organic extract was washed with water, hydrochloric acid solution, sodium bicarbonate solution and water to neutral, dried over anhydrous sodium sulfate and evaporated to dryness under reduced pressure. The residue was chromatographed on 50 g. on neutral alumina, thus producing 1α,3-dimethyl-5,10-methylene-19-nor-Δ²-androsten-17β-ol, and 1α,3-dimethyl-5,10-methylene-19-nor-Δ³-androsten-17β-ol in pure form.

Example III

By following the method of Example I, 1α-ethyl-5,10-methylene-19-nor-androstan-17β-ol-3-one, 1α-propyl-5,10-methylene-19-nor-androstan-17β-ol-3-one, 1α-vinyl-5,10-methylene-19-nor-androstan-17β-ol-3-one and 1α-ethinyl-5,10-methylene-19-nor-androstan-17β-ol-3-one were converted respectively into 1α-ethyl-3-methyl-5,10-methylene-19-nor-androstan-3,17β-diol, 1α-propyl - 3 - methyl-5,10-methylene-19-nor-androstan-3,17β-diol, 1α-vinyl-3-methyl-5,10-methylene-19-nor-androstan-3,17β-diol and 1α-ethinyl-3-methyl-5,10-methylene-19-nor-androstan-3,17β-diol.

These compounds were dehydrated in accordance with the method described in Example II, to produce respectively: 1α-ethyl-3-methyl-5,10-methylene-19-nor-Δ²-androsten-17β-ol and 1α-ethyl-3-methyl-5,10-methylene-19 - nor - Δ³ - androsten-17β-ol; 1α-propyl-3-methyl-5,10-methylene-19-nor-Δ²-androsten-17β-ol and 1α-propyl-3-methyl - 5,10 - methylene-19-nor-Δ³-androsten-17β-ol; 1α-vinyl-3-methyl-5,10-methylene-19-nor-Δ²-androsten-17β-ol and 1α-vinyl-3-methyl-5,10-methylene-19-nor - Δ³ - androsten-17β-ol; 1α-ethinyl-3-methyl-5,10-methylene-19-nor-Δ²-androsten-17β-ol and 1α-ethinyl-3-methyl-5,10-methylene-19-nor-Δ³-androsten-17β-ol.

Example IV

A solution of 5 g. of 1α-methyl-5,10-methylene-19-nor-androstan-17β-ol-3-one in 250 cc. of thiophene-free benzene was treated with 27.5 cc. of 4 N methyl-magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 1α,3-dimethyl-5,10-methylene-19-nor-androstane-3,17β-diol, identical to that obtained in Example I.

By the same method, the compounds listed below under I were treated with the indicated Grignard reagent, to produce the compounds mentioned under II.

1α-ethyl-3β-methyl-5,10-methylene-19-nor-androstan-17β-ol,

| I | Reagent | II |
|---|---|---|
| 1α-ethyl-5,10-methylene-19-nor-androstan-17β-ol-3-one | Vinylmagnesium bromide | 1α-ethyl-3-vinyl-5,10-methylene-19-nor-androstane-3,17β-diol. |
| 1α-propyl-5,10-methylene-19-nor-androstan-17β-ol-3-one | Ethylmagnesium bromide | 1α-propyl-3-ethyl-5,10-methylene-19-nor-androstane-3,17β-diol. |
| 1α-vinyl-5,10-methylene-19-nor-androstan-17β-ol-3-one | Propylmagnesium bromide | 1α-vinyl-3-propyl-5,10-methylene-19-nor-androstane-3,17β-diol. |
| 1α-ethinyl-5,10-methylene-19-nor-androstan-17β-ol-3-one | Ethinylmagnesium bromide | 1α,3-diethinyl-5,10-methylene-19-nor-androstane-3,17β-diol. |
| 1α-propenyl-5,10-methylene-19-nor-androstan-17β-ol-3-one | Methylmagnesium bromide | 1α-propenyl-3-methyl-5,10-methylene-19-nor-androstane-3,17β-diol. |
| 1α-propinyl-5,10-methylene-19-nor-androstan-17β-ol-3-one | Ethylmagnesium bromide | 1α-propinyl-3-ethyl-5,10-methylene-19-nor-androstane-3,17β-diol-. |
| 1α-methyl-5,10-methylene-19-nor-androstan-17β-ol-3-one | Ethinylmagnesium bromide | 1α-methyl-3-ethinyl-5,10-methylene-19-nor-androstane 3,17β-diol. |

*Example V*

Into a suspension of 1 g. of 1α-3-dimethyl-5,10-methylene-19-nor-androstane-3β,17β-diol in 35 cc. of glacial acetic acid, was passed a slow stream of dry hydrochloric acid; after 10 minutes all the solid material was dissolved. The gas was passed through the reaction mixture for a total of 5 hours. The solution was concentrated to about one third its initial volume by distillation under reduced pressure at 35° C., then it was poured into ice-water. The product was extracted with ether, washed to neutral, dried and evaporated to dryness. Chromatography of the residue on 50 g. of florisil afforded 1α,3-dimethyl-5,10-methylene-19-nor-Δ²-androsten-17β-ol and 1α,3-dimethyl-5,10-methylene-19-nor-Δ³-androsten-17β-ol in pure form, identical to the products obtained by the method of Example II.

In the same manner, the rest of the products obtained in the preceding example were converted respectively into: 1α - ethyl - 3 - vinyl-5,10-methylene-19-nor-Δ²-androsten-17β-ol and 1α-ethyl-3-vinyl-5,10-methylene-19-nor-Δ³-androsten-17β-ol; 1α-propyl-3-ethyl-5,10 - methylene - 19-nor-Δ²-androsten-17β-ol and 1α-propyl-3-ethyl-5,10-methylene-19-nor-Δ³-androsten-17β-ol; 1α-vinyl-3-propyl-5,10-methylene-19-nor-Δ²-androsten-17β-ol and 1α-vinyl-3-propyl-5,10-methylene-19-nor-Δ³-androsten-17β-ol; 1α,3 - diethinyl - 5,10 - methylene-19-nor-Δ²-androsten-17β-ol and 1α,3-diethinyl-5,10-methylene-19-nor-Δ³-androsten-17β-ol; 1α - propenyl - 3-methyl-5,10-methylene-19-nor-Δ²-androsten-17β-ol and 1α-propenyl-3-methyl-5,10-methylene-19-nor-Δ³-androsten-17β-ol; 1α-propinyl-3-ethyl-5,10-methylene-19-nor-Δ²-androsten-17β-ol and 1α-propinyl-3-ethyl-5,10 - methylene - 19-nor-Δ³-androsten-17β-ol; 1α-methyl-3-ethinyl - 5,10 - methylene-19-nor-Δ²-androsten-17β-ol and 1α-methyl-3-ethinyl-5,10-methylene - 19 - nor - Δ³ - androsten-17β-ol.

*Example VI*

A solution of 1 g. of 1α,3-dimethyl-5,10-methylene-19-nor-Δ²-androsten-17β-ol in 100 cc. of methanol was hydrogenated in the presence of 100 mg. of 5% palladium charcoal catalyst, until the absorption of hydrogen ceased (1 molar equivalent). The catalyst was filtered off and the filtrate evaporated to dryness. Crystallization of the residue from acetone-ether gave the pure 1α,3β-dimethyl-5,10-methylene-19-nor-androstan-17β-ol.

The same product was obtained when 1α,3-dimethyl-5,10-methylene-19-nor-Δ³-androsten-17β-ol was used as starting material.

*Example VII*

In accordance with the hydrogenation method described in the preceding example,

1α-ethyl-3-methyl-5,10-methylene-19-nor-Δ²-androsten-17β-ol,
1α-propyl-3-methyl-5,10-methylene-19-nor-Δ³-androsten-17β-ol and
1α-propyl-3-ethyl-5,10-methylene-19-nor-Δ³-androsten-17β-ol were converted into the corresponding saturated derivatives, namely 1α-propyl-3β-methyl-5,10-methylene-19-nor-androstan-17β-ol and
1α-propyl-3β-ethyl-5,10-methylene-19-nor-androstan-17β-ol.

*Example VIII*

A solution of 2 g. of 1α-ethinyl-3-methyl-5,10-methylene-19-nor-Δ³-androsten-17β-ol in 250 cc. of ethanol was hydrogenated in the presence of 200 mg. of 10% palladium charcoal catalyst, until the absorption of hydrogen ceased (3 molar equivalents). The catalyst was removed by filtration and the filtrate evaporated to dryness under reduced pressure. The residue was crystallized from acetone-ether, thus producing 1α,3β-dimethyl-5,10-methylene-19-nor-androstan-17β-ol identical to that obtained in Example VI.

In a similar manner, 1α-propinyl-3-ethyl-5,10-methylene-19-nor-Δ²-androsten-17β-ol was converted into 1α-propyl-3β-ethyl-5,10-methylene-19-nor-androstan-17β - ol, identical to the product obtained in Example VII.

*Example IX*

In the method of the preceding example there was used 1α-vinyl-3-methyl-5,10-methylene-19-nor-Δ² - androsten-17β-ol as starting material, and the uptake of hydrogen was of 2 molar equivalents. There was thus obtained 1α-ethyl-3β-methyl-5,10-methylene-19 - nor - androstan-17β-ol, identical to that obtained in Example VII.

*Example X*

A mixture of 1 g. of 1α,3-dimethyl-5,10-methylene-19-nor-Δ²-androsten-17β-ol, 4 cc. of pyridine and 2 cc. of acetic anhydride was kept at room temperature overnight, poured into ice water, the formed precipitate was filtered, washed with water and dried. Crystallization from acetone-hexane gave the acetate of 1α,3-dimethyl-5,10-methylene-19-nor-Δ²-androsten-17β-ol.

In a similar manner,

1α,3-diethinyl-5,10-methylene-19-nor-Δ³-androsten-17β-ol,
1α-ethyl-3-vinyl-5,10-methylene-19-nor-Δ²-androsten-17β-ol,
1α-propyl-3-ethyl-5,10-methylene-19-nor-Δ²-androsten-17β-ol,
1α,3β-dimethyl-19-nor-androstan-17β-ol and
1α-propyl-3β-ethyl-19-nor-androstan-17β-ol were converted into the corresponding acetates.

*Example XI*

A solution of 1 g. of 1α,3-dimethyl-5,10-methylene-19-nor-Δ²-androsten-17β-ol in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystalliaztion from acetone-hexane gave 1α,3-dimethyl-5,10-methylene-19-nor-Δ²-androsten-17-one.

The preceding compound was then treated with methyl magnesium bromide by following the method of Example IV, thus producing 1α,3,17α-trimethyl-5,10-methylene-19-nor-Δ²-androsten-17β-ol.

Example XII

By following the oxidation method described in the preceding example the compounds mentioned below under I were converted into the corresponding 17 ketones (II):

| I | II |
| --- | --- |
| 1α-ethyl-3-vinyl-5,10-methylene-19-nor-Δ²-androsten-17β-ol. | 1α-ethyl-3-vinyl-5,10-methylene-19-nor-Δ²-androsten-17-one. |
| 1α-propenyl-3-methyl-5,10-methylene-19-nor-Δ²-androsten-17β-ol. | 1α-propenyl-3-methyl-5,10-methylene-19-nor-Δ²-androsten-17-one. |
| 1α-methyl-3-ethinyl-5,10-methylene-19-nor-Δ²-androsten-17β-ol. | 1α-methyl-3-ethinyl-5,10-methylene-19-nor-Δ²-androsten-17-one. |
| 1α-propyl-3-ethyl-5,10-methylene-19-nor-Δ³-androsten-17β-ol. | 1α-propyl-3-ethyl-5,10-methylene-19-nor-Δ³-androsten-17-one. |
| 1α-vinyl-3-propyl-5,10-methylene-19-nor-Δ³-androsten-17β-ol. | 1α-vinyl-3-propyl-5,10-methylene-19-nor-Δ³-androsten-17-one. |
| 1α-propinyl-3-ethyl-5,10-methylene-19-nor-Δ³-androsten-17β-ol. | 1α-propinyl-3-ethyl-5,10-methylene-19-nor-Δ³-androsten-17-one. |
| 1α,3β-dimethyl-5,10-methylene-19-nor-androstan-17β-ol. | 1α,3β-dimethyl-5,10-methylene-19-nor-androstan-17-one. |
| 1α-propyl-3β-methyl-5,10-methylene-19-nor-androstan-17β-ol. | 1α-propyl-3β-methyl-5,10-methylene-19-nor-androstan-17-one. |
| 1α-ethyl-3β-methyl-5,10-methylene-19-nor-androstan-17β-ol. | 1α-ethyl-3β-methyl-5,10-methylene-19-nor-androstan-17-one. |
| 1α-propyl-3β-ethyl-5,10-methylene-19-nor-androstan-17β-ol. | 1α-propyl-3β-ethyl-5,10-methylene-19-nor-androstan-17-one. |

Example XIII

A solution of 1 g. of 1α,3-dimethyl-5,10-methylene-19-nor-Δ²-androsten-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 1α,3-dimethyl-17α-ethinyl-5,10-methylene-19-nor-Δ²-androsten-17β-ol.

By the same method, 1α-ethyl-3-vinyl-5,10-methylene-19-nor-Δ²-androsten-17-one, 1α-propyl-3-ethyl-5,10-methylene-19-nor-Δ³-androsten-17-one and 1α,3β-dimethyl-5,10-methylene-19-nor-androstan-17-one were converted respectively into 1α-ethyl-3-vinyl-17α-ethinyl-5,10-methylene-19-nor-Δ²-androsten-17β-ol, 1α-propyl-3-ethyl-17α-ethinyl-5,10-methylene-19-nor-Δ³-androsten-17β-ol and 1α,3β-dimethyl-17α-ethinyl-5,10-methylene-19-nor-androstan-17β-ol.

Example XIV

To a solution of 2 g. of 1α,3-dimethyl-5,10-methylene-19-nor-Δ²-androsten-17-one in 250 cc. of absolute ether was added dropwise, a solution of 10 molar equivalents of ethyl lithium in 50 cc. of ether with mechanical stirring and under an atmosphere of nitrogen. The mixture was further stirred for 48 hours at room temperature. After pouring into water, the resulting mixture was acidified with hydrochloric acid, stirring vigorously for 1 hour. The ether layer was separated, washed with water to neutral, dried over anhydrous sodium sulfate, filtered and the ether was evaporated to dryness. Recrystallization of the residue from acetone-hexane yielded 1α,3-dimethyl-17α-ethyl-5,10-methylene-19-nor-Δ²-androsten-17β-ol.

In a similar manner, 1α-propenyl-3-methyl-5,10-methylene-19-nor-Δ²-androsten-17-one, 1α-vinyl-3-propyl-5,10-methylene-19-nor-Δ³-androsten-17-one and 1α-propyl-3β-ethyl-5,10-methylene-19-nor-androstan-17-one, were converted respectively into 1α-propenyl-3-methyl-17α-ethyl-5,10-methylene-19-nor-Δ²-androsten-17β-ol, 1α-vinyl-3-propyl-17α-ethyl-5,10-methylene-19-nor-Δ³-androsten-17β-ol and 1α-propyl-3β,17α-diethyl-5,10-methylene-19-nor-androstan-17β-ol.

Example XV

By following the method of Example IV, the compounds mentioned below under I were treated with the indicated Grignard reagent, thus producing the compounds mentioned under II:

| I | Reagent | II |
| --- | --- | --- |
| 1α-methyl-3-ethinyl-5,10-methylene-19-nor-Δ²-androsten-17-one. | Methylmagnesium bromide. | 1α,17α-dimethyl-3-ethinyl-5,10-methylene-19-nor-Δ²-androsten-17β-ol. |
| 1α-propinyl-3-ethyl-5,10-methylene-19-nor-Δ³-androsten-17-one. | Propargylmagnesium bromide. | 1α,17α-dipropinyl-3-ethyl-5,10-methylene-19-nor-Δ³-androsten-17β-ol. |
| 1α-propyl-3β-methyl-5,10-methylene-19-nor-androstan-17-one. | Vinylmagnesium bromide. | 1α-propyl-3β-methyl-17α-vinyl-5,10-methylene-19-nor-androstan-17β-ol. |
| 1α-ethyl-3β-methyl-5,10-methylene-19-nor-androstan-17-one. | Propenylmagnesium bromide. | 1α-ethyl-3β-methyl-17α-propenyl-5,10-methylene-19-nor-androstan-17β-ol. |
| 1α,3β-dimethyl-5,10-methylene-19-nor-androstan-17-one. | Vinylmagnesium bromide. | 1α,3β-dimethyl-17α-vinyl-5,10-methylene-19-nor-androstan-17β-ol. |

Example XVI

In accordance with the method described in Example X, 1α,3 - dimethyl - 5,10-methylene-19-nor-Δ²-androsten-17β-ol, 1α-ethinyl-3-methyl-5,10-methylene-19-nor-Δ³-androsten - 17β-ol and 1α-ethyl-3β-methyl-5,10-methylene-19-nor-androstan-17β-ol were treated with propionic, caproic and cyclopentyl-propionic anhydrides to produce the corresponding esters.

Example XVII

To a solution of 500 mg. of 1α,3,17α-trimethyl-5,10-methylene-19-nor-Δ²-androsten-17β-ol, in 10 cc. of anhydrous benzene there were added 100 mg. of p-toluenesulfonic acid and 1.5 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 1α,3,17α-trimethyl-5,10-methylene-19-nor-Δ²-androsten-17β-ol.

By the same method, 1α,17α-dipropinyl-3-ethyl-5,10-methylene - 19-nor-Δ³-androsten-17β-ol, 1α,17α-dimethyl- 3-ethinyl-5,10-methylene-19-nor-Δ²-androsten - 17β-ol and 1α,3β-dimethyl-17α-vinyl-5,10-methylene-19-nor - androstan-17β-ol were converted into the corresponding acetates.

*Example XVIII*

A solution of 1 g. of 3-methyl-5,10-seco-5,19-cyclo-Δ¹⁽¹⁰⁾,²,⁴-androstatrien-17β-ol in 50 cc. of ethanol was mixed with 250 mg. of a 10% palladium on charcoal catalyst. The mixture was hydrogenated at room temperature, at atmospheric pressure, until the absorption of hydrogen ceased (approximately 2 molar equivalents of hydrogen were absorbed). The catalyst was removed by filtration, and the solvent evaporated under reduced pressure, water was added to the residue and the product was extracted with methylene chloride. The extract was washed with water, dried over anhydrous sodium sulfate and evaporated to dryness under vacuum. Crystallization from acetone-hexane afforded 3β-methyl-5,10-methylene-19-nor-androstan-17β-ol.

By the same method, the compounds mentioned below under I were converted into the saturated compounds listed under II:

| I | II |
|---|---|
| 3-ethyl-5,10-seco-5,19-cyclo-Δ¹⁽¹⁰⁾,²,⁴-androstatrien-17β-ol. | 3β-ethyl-5,10-methylene-19-nor-androstan-17β-ol. |
| 3-propyl-5,10-seco-5,19-cyclo-Δ¹⁽¹⁰⁾,²,⁴-androstatrien-17β-ol. | 3β-propyl-5,10-methylene-19-nor-androstan-17β-ol. |
| 3,17α-dimethyl-5,10-seco-5,19-cyclo-Δ¹⁽¹⁰⁾,²,⁴-androstatrien-17β-ol. | 3β,17α-dimethyl-5,10-methylene-19-nor-androstan-17β-ol. |
| 3,17α-diethyl-5,10-seco-5,19-cyclo-Δ¹⁽¹⁰⁾,²,⁴-androstatrien-17β-ol. | 3β,17α-diethyl-5,10-methylene-19-nor-androstan-17β-ol. |

*Example XIX*

A solution of 1 g. of 3-ethinyl-5,10-seco-5,19-cyclo-Δ¹⁽¹⁰⁾,²,⁴-androstatrien-17β-ol in 70 cc. of methanol was hydrogenated in the presence of 500 mg. of 10% palladium charcoal catalyst until the uptake of hydrogen ceased. The catalyst was filtered off and the filtrate evaporated to dryness. The residue was crystallized from acetone-ether, to produce 3-ethyl-5,10-methylene-19-nor-androstan-17β-ol, identical to the product obtained from 3-ethyl-5,10-seco-5,19-cyclo-Δ¹⁽¹⁰⁾,²,⁴-androstatrien - 17β - ol, in the previous example.

In a similar manner, starting from 3,17α-divinyl-5,10-seco-5,19-cyclo-Δ¹⁽¹⁰⁾,²,⁴-androstatrien-17β-ol there was produced 3β,17α-diethyl-5,10-methylene - 19 - nor-androstan-17β-ol, identical to that obtained in Example XIV.

*Example XX*

In accordance with the method of Example XI, 3β-methyl-5,10-methylene-19-nor-androstan-17β-ol, 3β-ethyl-5,10-methylene-19-nor-androstan-17β-ol and 3β-propyl-5,10-methylene-19-nor-androstan-17β-ol were oxidized with 8 N chromic acid in acetone solution, to produce respectively: 3β-methyl-5,10-methylene-19-nor-androstan-17-one, 3β-ethyl-5,10-methylene-19-nor-androstan-17-one and 3β-propyl-5,10-methylene-19-nor-androstan-17-one.

*Example XXI*

The compounds obtained in the preceding example were treated with potassium acetylide, in accordance with the method of Example XIII, to produce respectively: 3β-methyl-17α-ethinyl-5,10-methylene - 19 - nor - androstan-17β-ol, 3β-ethyl-17α-ethinyl-5,10-methylene-19-nor-androstan-17β-ol and 3β-propyl-17α-ethinyl-5,10-methylene-19-nor-androstan-17β-ol.

*Example XXII*

A solution of 1 g. of 3β-methyl-17α-ethinyl-5,10-methylene-19-nor-androstan-17β-ol, in 40 cc. of pyridine was hydrogenated at 25° C. and 570 mm. in the presence of 400 mg. of pre-hydrogenated 2% palladium calcium carbonate catalyst.

When 1.1 molar equivalents of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 3β-methyl-17α-vinyl-5,10-methylene-19-nor-androstan-17β-ol.

In a similar manner, 3β-ethyl-17α-ethinyl-5,10-methylene-19-nor-androstan-17β-ol and 3β-propyl-17α-ethinyl-5,10-methylene-19-nor-androstan-17β-ol were converted into 3β-ethyl-17α-vinyl-5,10-methylene-19-nor-androstan-17β-ol and 3β-propyl-17α-vinyl-5,10-methylene-19-nor-androstan-17β-ol respectively.

*Example XXIII*

By following the method of Example X, 3β-methyl-5,10-methylene-19-nor-androstan-17β-ol, 3β-ethyl-5,10-methylene-19-nor-androstan-17β-ol and 3β-propyl-5,10-methylene-19-nor-androstan-17β-ol, were treated with acetic, propionic and undecenoic anhydride in pyridine solution, to produce the corresponding acetates, propionates and undecenoates.

*Example XXIV*

By following the method of Example XVII, the compounds mentioned below under I were treated with the indicated acid anhydride, to produce the corresponding esters (II):

| I | Anhydride | II |
|---|---|---|
| 3β,17α-dimethyl-5,10-methylene-19-nor-androstan-17β-ol | Propionic | Propionate of 3β,17α-dimethyl-5,10-methylene-19-nor-androstan-17β-ol. |
| 3β,17α-diethyl-5,10-methylene-19-nor-androstan-17β-ol | Acetic | Acetate of 3β,17α-diethyl-5,10-methylene-19-nor-androstan-17β-ol. |
| 3β-methyl-17α-ethinyl-5,10-methylene-19-nor-androstan-17β-ol | Caproic | Caproate of 3β-methyl-17α-ethinyl-5,10-methylene-19-nor-androstan-17β-ol. |
| 3β-ethyl-17α-vinyl-5,10-methylene-19-nor-androstan-17β-ol | Cyclopentylpropionic | Cyclopentylpropionate of 3β-ethyl-17α-vinyl-5,10-methylene-19-nor-androstan-17β-ol. |
| 3β-propyl-17α-ethinyl-5,10-methylene-19-nor-androstan-17β-ol | Acetic | Acetate of 3β-propyl-17α-ethinyl-5,10-methylene-19-nor-androstan-17β-ol. |
| 1α,17α-dimethyl-3-ethinyl-5,10-methylene 19-nor-Δ²-androsten-17β-ol | Propionic | Propionate of 1α,17α-dimethyl-3-ethinyl-5,10-methylene-19-nor-Δ²-androsten-17β-ol. |
| 1α,17α-dipropinyl-3-ethyl-5,10-methylene-19-nor-Δ³-androsten-17β-ol | Caproic | Caproate of 1α,17α-di-propinyl-3-ethyl-5,10-methylene-19-nor-Δ³-androsten-17β-ol. |
| 1α-propyl-3β-methyl-17α-vinyl-5,10-methylene-19-nor-androstan-17β-ol | Enanthic | Enanthate of 1α-propyl-3β-methyl-17α-vinyl-5,10-methylene-19-nor-androstan-17β-ol. |
| 1α-ethyl-3β-methyl-17α-propenyl-5,10-methylene-19-nor-androstan-17β-ol | Cyclopentylpropionic | Cyclopentylpropionate of 1α-ethyl-3β-methyl-17α-propenyl-5,10-methylene-19-nor-androstan-17β-ol. |
| 1α,3β-dimethyl-17α-vinyl-5,10-methylene-19-nor-androstan-17β-ol | Propionic | Propionate of 1α,3β-dimethyl-17α-vinyl-5,10-methylene-19-nor-androstan-17β-ol. |

I claim:
1. A compound of the following formula:

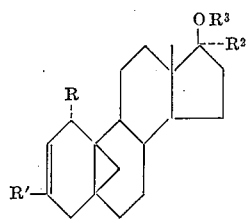

wherein R and R¹ are selected from the group consisting of lower alkyl, lower alkenyl and lower alkinyl; R² is selected from the group consisting of hydrogen, lower alkyl, lower alkenyl and lower alkinyl and R³ is selected from a group consisting of hydrogen and a hydrocarbon carboxylic acyl group of less than 12 carbon atoms.

2. 1α,3 - dimethyl - 5,10 - methylene - 19 - nor - Δ²-androsten-17β-ol.

3. 1α,3,17α - trimethyl - 5,10 - methylene - 19 - nor-Δ²-androsten-17β-ol.

4. 1α - methyl - 3 - ethinyl - 5,10 - methylene - 19 - nor-Δ²-androsten-17β-ol.

5. 1α,17α - dimethyl - 3 - ethynyl - 5,10 - methylene-19-nor-Δ²-androsten-17β-ol.

6. A compound of the following formula:

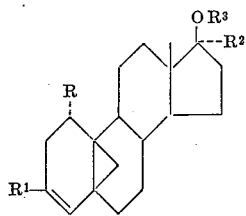

wherein R and R¹ are selected from the group consisting of lower alkyl, lower alkenyl and lower alkinyl; R² is selected from the group consisting of hydrogen, lower alkyl, lower alkenyl and lower alkinyl and R³ is selected from the group consisting of hydrogen and a hydrocarbon carboxylic acyl group of less than 12 carbon atoms.

7. 1α,3 - dimethyl - 5,10 - methylene - 19 - nor - Δ³-androsten-17β-ol.

8. 1α - ethyl - 3 - methyl - 5,10 - methylene - 19 - nor-Δ³-androsten-17β-ol.

9. 1α,17α - dipropinyl - 3 - ethyl - 5,10 - methylene - 19-nor-Δ³-androsten-17β-ol.

10. 1α - propyl - 3 - ethyl - 17α - ethinyl - 5,10 - methylene-19-nor-Δ³-androsten-17β-ol.

11. A compound of the following formula:

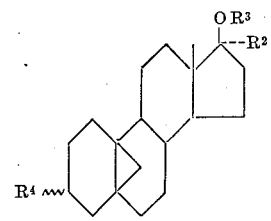

wherein R² is selected from the group consisting of hydrogen, lower alkyl, lower alkenyl and lower alkinyl and R³ is selected from the group consisting of hydrogen and a hydrocarbon carboxylic acyl group of less than 12 carbon atoms; and R⁴ represents a lower alkyl radical.

12. 3β - methyl - 5,10 - methylene - 19 - nor - androstan-17β-ol.

13. 3β - propyl - 5,10 - methylene - 19 - nor - androstan-17β-ol.

14. 3β,17α - dimethyl - 5,10 - methylene - 19 - nor - androstan-17β-ol.

15. 3β - methyl - 17α - ethinyl - 5,10 - methylene - 19-nor-androstan-17β-ol.

16. A compound of the following formula:

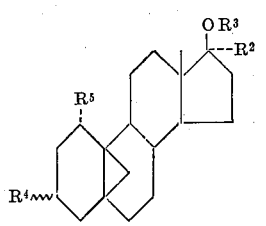

wherein R² is selected from the group consisting of hydrogen, lower alkyl, lower alkenyl and lower alkinyl and R³ is selected from the group consisting of hydrogen and a hydrocarbon carboxylic acyl group of less than 12 carbon atoms; and R⁴ and R⁵ represent a lower alkyl radical.

17. 1α,3β - dimethyl - 5,10 - methylene - 19 - nor - androstan-17β-ol.

18. 1α,3β - dimethyl - 17α - vinyl - 5,10 - methylene-19-nor-androstan-17β-ol.

No references cited.

LEWIS GOTTS, *Primary Examiner.*
HENRY A. FRENCH, *Assistant Examiner.*